United States Patent
Pruiett et al.

(10) Patent No.: US 7,987,385 B2
(45) Date of Patent: Jul. 26, 2011

(54) METHOD FOR HIGH INTEGRITY AND HIGH AVAILABILITY COMPUTER PROCESSING

(75) Inventors: Jay R. Pruiett, Aida, MI (US); Gregory R. Sykes, Caledonia, MI (US); Timothy D. Skutt, Kentwood, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 247 days.

(21) Appl. No.: 12/138,741

(22) Filed: Jun. 13, 2008

(65) Prior Publication Data
US 2009/0031115 A1    Jan. 29, 2009

Related U.S. Application Data

(60) Provisional application No. 60/935,044, filed on Jul. 24, 2007.

(51) Int. Cl.
   *G06F 11/00*    (2006.01)
(52) U.S. Cl. .......................... 714/11; 714/10
(58) Field of Classification Search .............. 714/10, 714/11
   See application file for complete search history.

(56) References Cited

U.S. PATENT DOCUMENTS

| | | | |
|---|---|---|---|
| 5,226,152 A | 7/1993 | Klug et al. | |
| 6,615,366 B1 * | 9/2003 | Grochowski et al. | 714/10 |
| 6,640,313 B1 * | 10/2003 | Quach | 714/10 |
| 7,287,185 B2 * | 10/2007 | Safford et al. | 714/11 |
| 7,526,673 B2 * | 4/2009 | Inoue et al. | 714/11 |
| 7,669,079 B2 * | 2/2010 | Weiberle et al. | 714/10 |
| 7,725,899 B2 * | 5/2010 | Safford et al. | 718/104 |
| 2002/0073357 A1 * | 6/2002 | Dhong et al. | 714/19 |
| 2008/0320287 A1 | 12/2008 | von Collani et al. | |

FOREIGN PATENT DOCUMENTS

| | | |
|---|---|---|
| EP | 0969374 A2 | 1/2000 |
| GB | 2425380 A | 10/2006 |

* cited by examiner

*Primary Examiner* — Marc Duncan
(74) *Attorney, Agent, or Firm* — GE Aviation Systems LLC; William Scott Andes

(57) ABSTRACT

A method of providing high integrity checking for an N-lane computer processing module (Module), N being an integer greater than equal to two. The method comprises the steps of: detecting, by a data Output Management unit (OM), when any of the N processing lanes sends different output data; configuring each Hosted Application as either normal or high integrity; for the Hosted Applications configured as high integrity, running an identical version of the software source code targeted for similar or dissimilar microprocessors on all N processing lanes, and activating a Time Management Unit, Critical Regions Management Unit, data Input Management Unit and data Output Management Unit for each of the N processing lanes; and for the Hosted Applications configured as normal integrity, running a copy of the software on one of the N processing lanes, and not activating the Time Management Unit, Critical Regions Management Unit, Input Management Unit and Output Management Unit for the one activated processing lane while that Hosted Application is running.

18 Claims, 8 Drawing Sheets

METHOD FOR HIGH INTEGRITY AND HIGH AVAILABILITY COMPUTER PROCESSING

CROSS REFERENCE TO RELATED APPLICATION

This application claims priority to provisional application Ser. No. 60/935,044, entitled "High Integrity and High Availability Computer Processing Module and Method", filed Jul. 24, 2007.

BACKGROUND OF THE INVENTION

The technology described herein relates to a method for high integrity and high availability at the source processing that places minimal design constraints on the software applications (Hosted Applications) that are hosted on a computer processing module (Module) such that they can still run on typical normal integrity computer processing modules.

Computer processing modules (Modules) can provide high integrity and high availability at the source to ensure that faults are detected and isolated with precision and that false alarms are minimized. High integrity Modules are even more important for aircraft, whereby a fault that is not promptly and accurately detected and isolated may result in operational difficulties. The proper detection and isolation of faults in a module that provides high integrity at the source is sometimes referred to as the ability to establish fault containment zones (FCZ) within the module or system, such that a fault is not able to propagate outside of the FCZ in which it occurred. Also, it is important that high integrity Modules should also have a very low probability of false alarms, since each false alarm may result in a temporary loss of function or wasted computer resources to correct a purported problem that does not in fact exist.

Conventional designs for high integrity at the source Modules require expensive custom circuitry in order to implement instruction level lock-step processing between two or more microprocessors on the Module. The conventional instruction level lock-step processing approaches provide high integrity to all of the hosted applications but may be difficult (or impossible) to implement with state of the art microprocessors that implement embedded memory controllers and input/output support requiring multiple Phase Lock Loops (PLLs) with different clock recovery circuits.

There is a need for a high integrity at the source design for a Module which places minimal design constraints on the Hosted Applications (i.e. the same Hosted Application can also be run on a typical normal integrity Module) and which is capable of utilizing high speed microprocessors (e.g., integrated processors).

SUMMARY OF THE INVENTION

One aspect of the invention relates to a method of providing high integrity checking for an N-lane computer processing module (Module), N being an integer greater than equal to two. The method comprises the steps of: detecting, by a data Output Management unit (OM), when any of the N processing lanes sends different output data; configuring each Hosted Application as either normal or high integrity; for the Hosted Applications configured as high integrity, running an identical version of the software source code targeted for similar or dissimilar microprocessors on all N processing lanes, and activating a Time Management Unit, Critical Regions Management Unit, data Input Management Unit and data Output Management Unit for each of the N processing lanes; and for the Hosted Applications configured as normal integrity, running a copy of the software on one of the N processing lanes, and not activating the Time Management Unit, Critical Regions Management Unit, Input Management Unit and Output Management Unit for the one activated processing lane while that Hosted Application is running.

BRIEF DESCRIPTION OF THE DRAWINGS

The exemplary embodiments will hereafter be described with reference to the accompanying drawings, wherein like numerals depict like elements, and in which.

DESCRIPTION OF THE PREFERRED EMBODIMENTS

Figure 1:
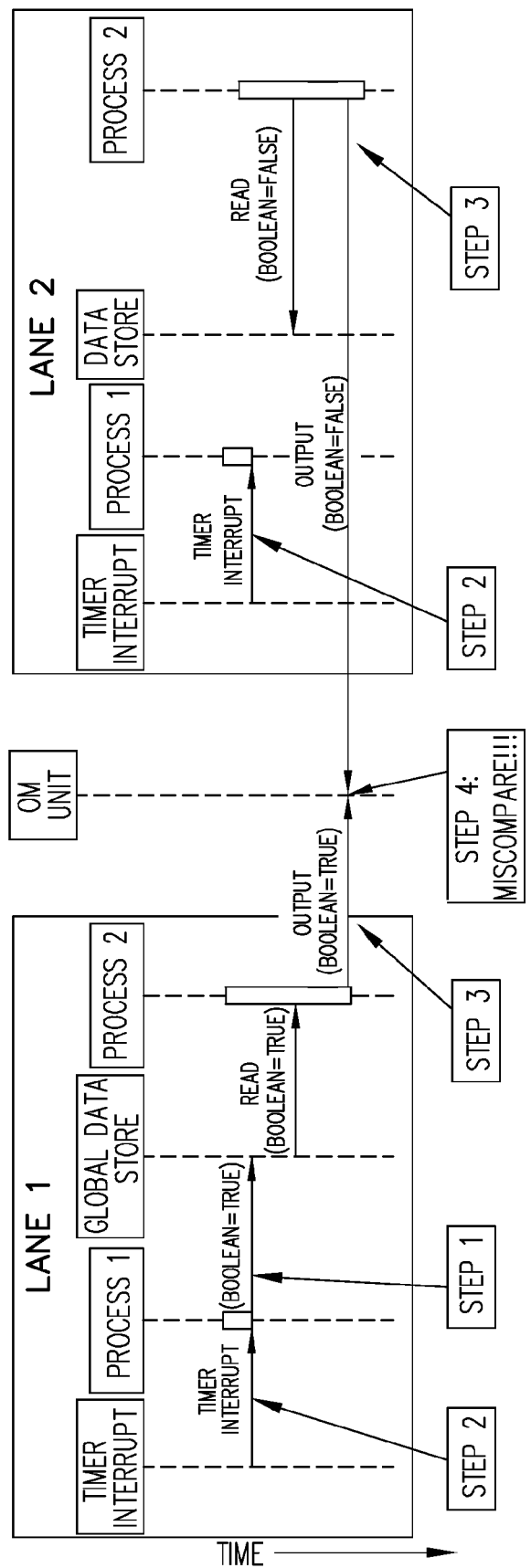
FIG. 1 shows a first scenario for which it is desired to be mitigated, such that failure conditions are precluded for Hosted Applications.

In the following description, for the purposes of explanation, numerous specific details are set forth in order to provide a thorough understanding of the technology described herein. It will be evident to one skilled in the art, however, that the exemplary embodiments may be practiced without these specific details. In other instances, structures and device are shown in diagram form in order to facilitate description of the exemplary embodiments.

The exemplary embodiments are described below with reference to the drawings. These drawings illustrate certain details of specific embodiments that implement the module, method, and computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configuration, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

A first embodiment will be described in detail herein below, which corresponds to a loosely synchronized approach for providing high integrity at the source of a system comprised of a computer processing module (Module).

High Integrity at the source computing currently requires at least two processing lanes running in lockstep at the instruction level, or a processing lane and a monitor. For a dual lane, high-integrity at the source processing Module, the problem to be solved can be compared to a finite state machine. That is, if the software running on each processing lane of a Module receives the same inputs (data, interrupts, time, etc.) and is able to perform the same "amount" of processing on the data before sending outputs or before receiving new inputs, then each lane will produce identical outputs in the absence of failures. It should be noted that this embodiment is primarily described in terms of a Module where each processing lane has identical microprocessors. However, this embodiment also applies to Modules that have dissimilar processors on one or more of the N lanes. In this case it is expected that each processing lane will produce outputs that are identical within a specified range (perhaps due to difference in the floating point unit of the microprocessor for example).

The implications of the finite state machine analogy are as follows. When the software running on a Module receives inputs, the inputs must be identical on both lanes AND both lanes must receive the inputs when they are in exactly the same state. Inputs should be considered those explicitly requested (e.g. ARINC653 port data, timestamp, etc.) or those received due to an external event (hardware interrupt, virtual interrupt, etc.). Particular attention is given to inputs that would cause the software to change its thread of execution (state) due to, for example, priority preemptive behavior. When the software running on a Module sends an output, the data from both lanes must be compared before it is output. In order to ensure that the output data comparison does not fail (because of improper state synchronization), the portions of the software responsible for producing the output data must reach the same state in both lanes before the outputs can be compared and then subsequently transmitted.

Figure 2:
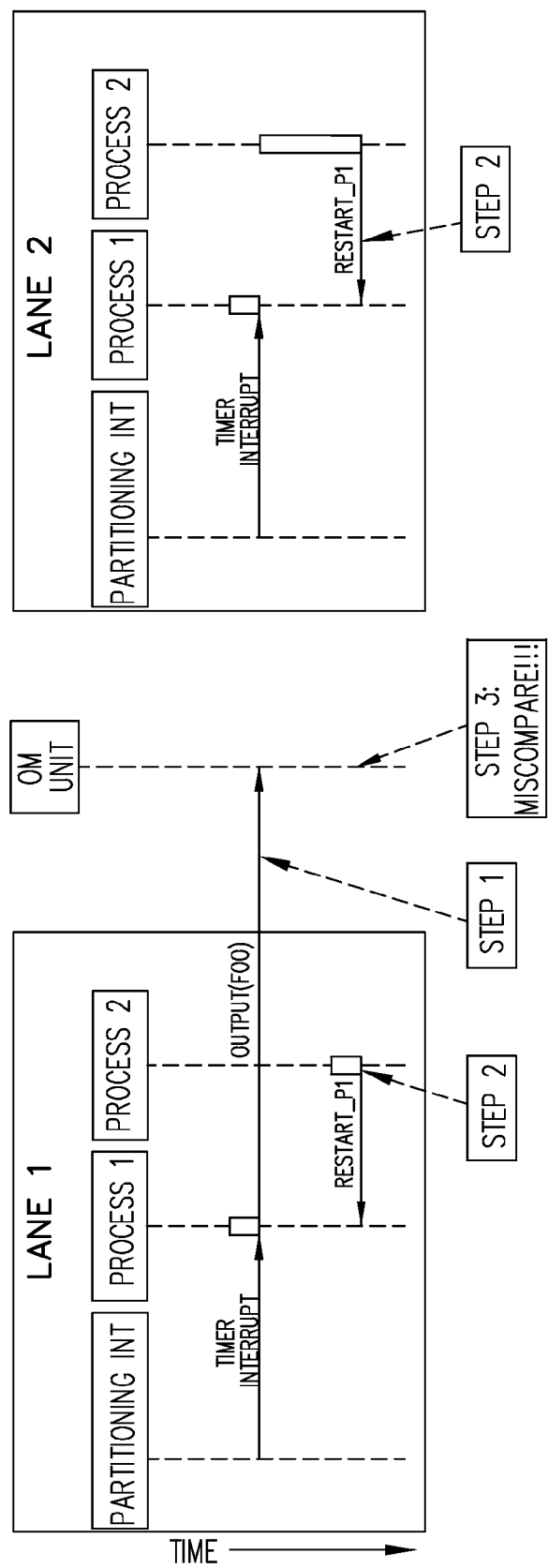
FIG. 2 shows a second scenario for which it is desired to be mitigated, such that failure conditions are precluded for Hosted Applications.

The scenarios shown in FIG. 1 and FIG. 2 provide illustrations of two potential failure scenarios that must be mitigated, such that the failure conditions will be precluded (by Module design). These specific scenarios have been selected, because it is believed that a Module design which can mitigate these failure conditions has a high probability of being able to handle (or can be extended to handle) a more general design constraint of input data equivalency and control synchronization for the software running on N lanes of a Module.

Turning now to FIG. 1, a first type of potential failure condition is described for a two-lane high integrity Module. In this Module, Lanes 1 and 2 are running loosely synchronized but without the addition of the TM and CRM units described herein. In this case, loosely synchronized means that Lane 1 could be anywhere from less than one instruction ahead or behind of Lane 2, to any number of instructions ahead or behind of Lane 2. For the example shown in FIG. 1, Lane 1 is "ahead" of Lane 2. The initial condition of the Boolean used in this example is "False".

In Step 1, Process 1 in Lane 1 has just completed setting a Boolean to "True" when a timer interrupt occurs. Process 1 in Lane 2 has not quite had a chance to set the Boolean to "True" (whereby the Boolean is still "False").

In Step 2, the interrupt causes the Hosted Application in both Lane 1 and Lane 2 to switch to Process 2 (due to priority preemption).

In Step 3, Process 2 in Lane 1 and Process 2 in Lane 2 read the Boolean and send an output which includes the state of the Boolean. Lane 1 outputs True while Lane 2 outputs False.

In Step 4, a data Output Management (OM) unit detects a mis-compare between the two lanes. This is a type of failure that could have been prevented (thus increasing availability) if proper synchronization between the two computing lanes had been provided by the Module.

Turning now to FIG. 2, a second type of potential failure condition is described for a two-lane high integrity Module. In this system, Lanes 1 and 2 are running loosely synchronized but without the TM and CRM units described herein. In this case, loosely synchronized means that Lane 1 could be anywhere from less than one instruction ahead or behind of Lane 2, to any number of instructions ahead or behind of Lane 2. For the example shown in FIG. 2, Lane 1 is "ahead" of Lane 2.

In Step 1, Process 1 in Lane 1 (a low priority background process) has just completed an output transaction on Port FOO when a timer interrupt occurs. Process 1 in Lane 2 has not completed the same output transaction.

In Step 2, the background process (Process 1) no longer runs because it is a low priority. Rather, a high priority process (Process 2) runs in both lanes and receives input data that causes Process 1 to be re-started. Thus, Process 1 in Lane 2 never sends its output.

In Step 3, eventually (within some bounded time limit) the data Output Management unit reports a failure due to the fact that Lane 2 never sent an output on port FOO. This is a type of failure that could have been prevented (thus increasing availability) if proper synchronization between the two computing lanes had been provided by the Module.

The architectural approach utilized in the first embodiment is that the Hardware and Software components of the Module work together to ensure that the software state of each processing lane is synchronized before (and while) I/O processing is performed. It should be noted that 'software' refers to both the Hosted Application software and the software component of the Module. It should also be noted that the term "synchronized" means that each of the lanes have completed the same set of critical regions and are both within the same critical region gathering the same inputs, or are both within the same critical region sending the same outputs. The I/O output from each of the N lanes is compared and must pass this comparison before being output.

The top level attributes of the architectural approach are as follows. The architecture supports robustly time and/or space partitioned environments typical of Modules that support virtualization (e.g. as specified by the ARINC specification 653) as well as environments where the Module only supports a single Hosted Application. The architecture supports identical or dissimilar processors (2 or more) on the N processing lanes of the Module. The architecture is loosely synchronous, whereby computational states are synchronized. The architecture abstracts redundancy management (synch and compare) from the Hosted Applications to the greatest extent possible. This enables Hosted Application suppliers to use conventional design standards for their software (they are not required to add in special high integrity features) and will enable them to run the same Hosted Application software on typical normal integrity Modules. The architecture is parametric such that the units providing high integrity and availability can be statically configured. This enables some Hosted Applications (or data to/from those Hosted Applications) to be configured as normal integrity. The architecture ensures that faults are detected in time to mitigate functional hazards due to erroneous output.

Figure 3:
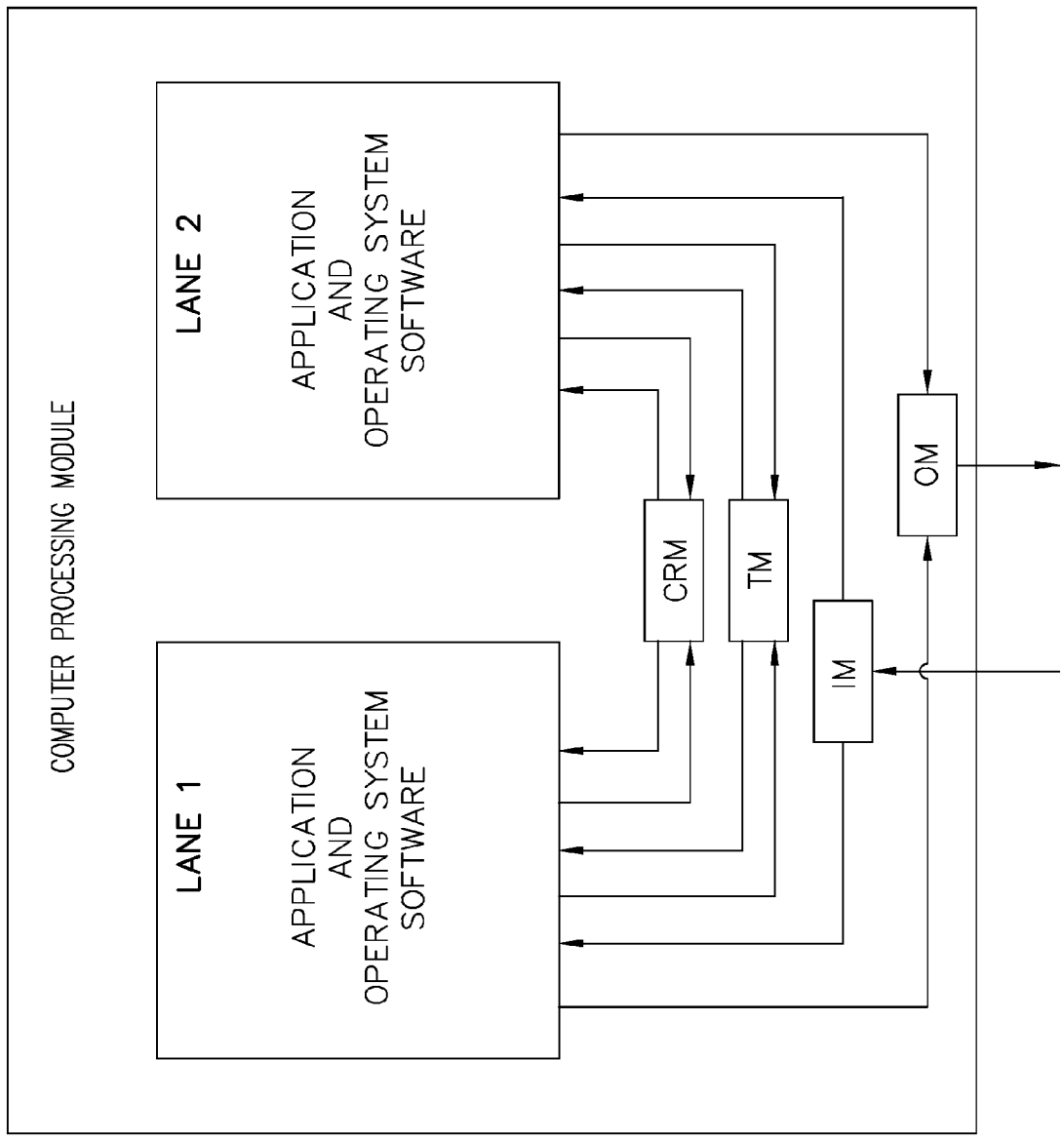
FIG. 3 is a logical block diagram of the Time Management (TM), Critical Region Management (CRM), data Input Management (IM) and data Output Management (OM) units.

To implement this approach, a system and method according to the first embodiment provides mechanisms (or elements) that include: data Input Management (IM), Time Management (TM), Critical Regions Management (CRM) and data Output Management (OM). FIG. 3 shows a logical block diagram of how these elements relate to both the Module and the Hosted Application software. Each of these elements will be described in detail.

In one possible implementation of the first embodiment, the IM, TM, CRM and OM mechanisms are built into an I/O element that is connected to the Hosted Application processor element via a high speed bus (e.g. PCI-Express or a proprietary bus). Two I/O elements are utilized (with a communication channel between them) in order to support high-integrity requirements. In addition, the software on the Hosted Application element interacts with these mechanisms at prescribed synchronization points.

Figure 4:
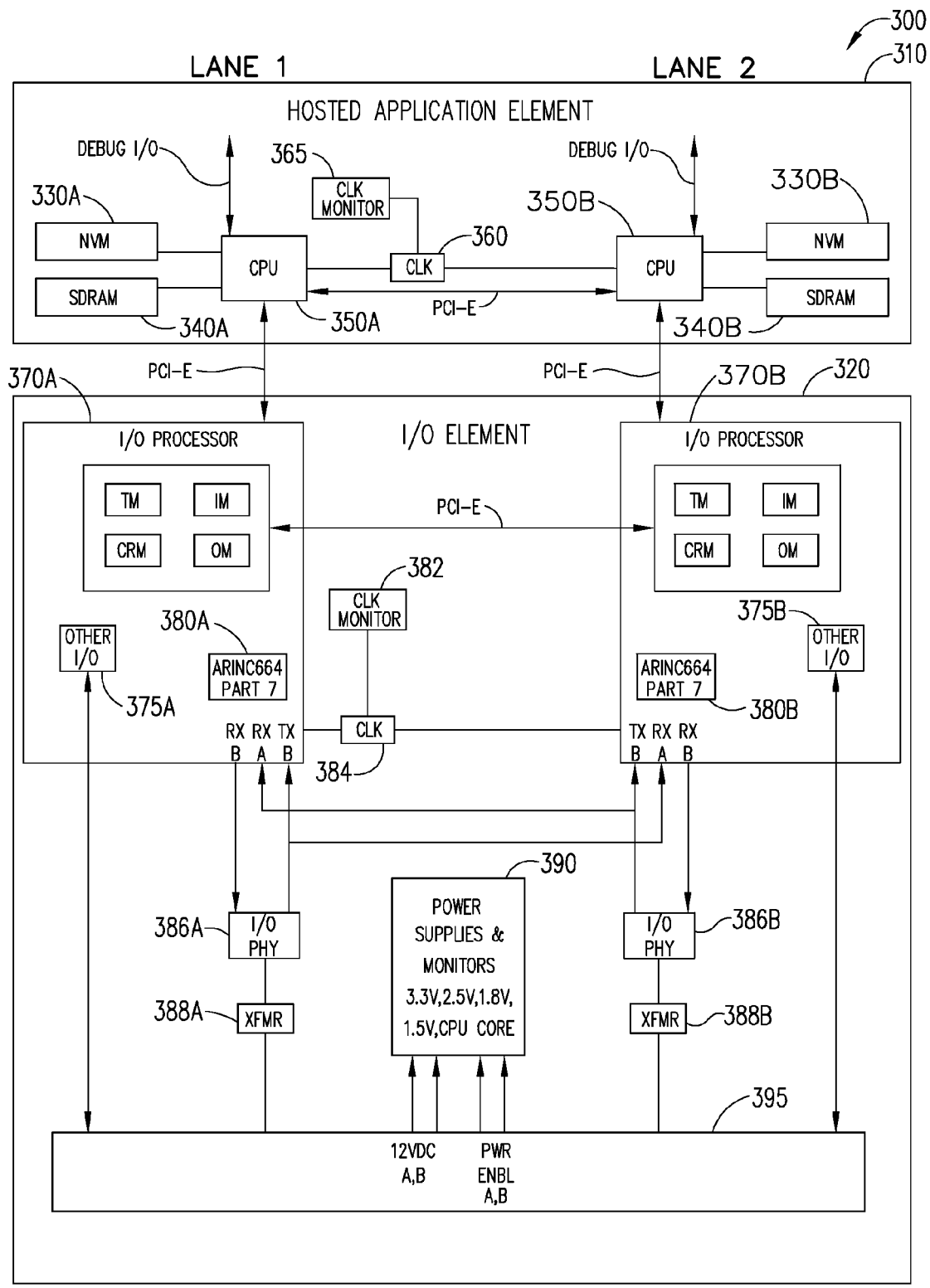
FIG. 4 is a block diagram showing a high integrity loosely synchronized Computer Processing Module (Module) according to an exemplary embodiment.

FIG. 4 shows a block diagram of how this functionality could be implemented in a two lane high integrity Module, according to the first embodiment. One of ordinary skill in the art will recognize that there are many other possible implementations of the first embodiment including the following. A Module that consists of two processing lanes each containing a highly integrated dual (or multi) core microprocessor and associated clocks, memory devices, I/O devices, etc., where the functionality of the Hosted Application Element 310 is implemented via Module hardware and software components utilizing one or more of the microprocessor cores (and associated clocks, memory, I/O devices, etc.) and the functionality of the I/O Element 320 is implemented via Module hardware and software components utilizing one or more of the embedded microprocessor cores (and associated memory, I/O devices, etc.) on each lane. A Module that consists of two processing lanes each containing a single core microprocessor and associated clocks, memory devices, I/O devices, etc., where all of the functionality of the Hosted Application Element 310 and the I/O Element 320 for each lane is implemented via Module hardware and software components provided by the microprocessor core and associated memory, I/O devices, etc., on each lane.

As shown in the example provided in FIG. 4, a High Integrity loosely synchronized Module 300 according to the first embodiment includes two lanes, Lane 1 and Lane 2, whereby the first embodiment may be utilized in an N lane Module, N being a positive integer greater than or equal to two. The Module 300 also includes a Hosted Application Element 310, which has a Processor CPU 350A, 350B for each lane (in the example shown in FIG. 4, there are two Processor CPUs, one 350A for Lane 1 and one 350B for Lane 2). Each Processor CPU 350A, 350B has access to a Non-Volatile Memory (NVM) 330A, 330B and a Synchronous Dynamic Random-Access Memory (SDRAM) 340A, 340B, whereby a clock circuit is provided for each Processor CPU. FIG. 4 shows one clock circuit 360 that provides a clock signal to each Processor CPU 350A, 350B, whereby a Clock Monitor 365 is also provided to ensure a stable clock signal is provided to the Processor CPUs 350A, 350B of each lane at all times. One of ordinary skill in the art will recognize that the clock 360 and clock monitor 365 on the Hosted Application Element 310 could be replaced with an independent clock running on each lane and the clock 384 and clock monitor 382 on the I/O Element 320 could be replaced with an independent clock running on each lane, while remaining within the spirit and scope of the embodiment described herein.

The Hosted Application Element 310 is communicatively connected to an I/O Element 320 in each respective lane, by way of a PCI-E bus. In addition, each lane of the Hosted Application Element 310 is connected to the other lane of the Hosted Application Element 310 by way of a PCI-E bus. One of ordinary skill in the art will recognize that other types of buses, switched networks or memory devices may be utilized to provide such a communicative connection within the Hosted Application Element 310 and between the Hosted Application Element 310 and the I/O Element 320, while remaining within the spirit and scope of the embodiment described herein.

The I/O Element 320 includes a Lane 1 I/O Processor 370A, and a Lane 2 I/O Processor 370B, whereby these I/O Processors 370A, 370B are communicatively connected to each other by way of a PCI-E bus. One of ordinary skill in the art will recognize that other types of buses, switched networks or memory devices may be utilized to provide such a communicative connection between the I/O Processors 370A, 370B of each lane, while remaining within the spirit and scope of the embodiments described herein.

Each I/O Processor 370A, 370B includes a data Input Management element (IM), a Time Management element (TM), a Critical Regions Management element (CRM) and a data Output Management element (OM). Each I/O Processor 370A, 370B also includes an Other I/O element 375A, 375B and an ARINC 664 Part 7 element 380A, 380B, whereby these elements are known to those of ordinary skill in the aircraft computer processing arts, and will not be described any further for purposes of brevity. One of ordinary skill in the art will recognize that other types of I/O data buses (other than ARINC664 Part 7) may be utilized to provide such a communicative connection for the Module, while remaining within the spirit and scope of the embodiment described herein.

A clock unit 384 and a clock monitor 382 are also shown in FIG. 4, for providing a stable clock signal to each I/O Processor 370A, 370B in each lane of the multi-lane Module. One of ordinary skill in the art will recognize that the clock 384 and clock monitor 382 on the I/O Element 320 could be replaced with an independent clock running on each lane, while remaining within the spirit and scope of the embodiment described herein.

FIG. 4 also shows an I/O PHY unit 386A, 386B for each lane, an XFMR unit 388A, 388B for each lane, and a Power Supplies and Monitors unit 390 that provides power signals and that performs monitoring for components in each lane of the multi-lane Module. An interface unit 395 provides signal connections for power (e.g., 12V DC, PWR ENBL) to various components of the Module 300. Power may be provided to the interface unit 395 (and thus to the various components of the high-integrity Module 300) from an engine of the aircraft (when the aircraft engine is turned on) or from a battery or generator (when the aircraft engine is turned off), by way of example. One of ordinary skill in the art will recognize that the Power Supplies and Monitors 390 could be implemented as either independent (one per lane) or as a single power supply and monitor for the Module, while remaining within the spirit and scope of the embodiments described herein.

The following provides an overview of the IM, TM, CRM, and the OM mechanisms.

The IM ensures that the software running all computing lanes receive exactly the same set of High-Integrity input data. If the same set of data cannot be provided to each lane, the IM will discard the data, prevent either lane from receiving the data and report the error condition.

There may be a great deal of the data flows that are considered normal-integrity. That is, there may be a great deal of data flowing into the Module or flowing from Hosted Applications in the Module that does not require dual-lane I/O interfaces (and the associated overhead to perform the cross-lane data validation). The first embodiment enables normal-integrity data flows to be provided to both computing lanes from one normal-integrity source. This optimization may be implemented via a configuration parameter that designates each data flow (e.g. each ARINC664 Part 7 virtual link destined for or sent from a Hosted Application) as either normal or high integrity.

In one possible implementation of the first embodiment for use on a commercial aircraft, examples of the services that need to provide input data equivalence on multiple lanes are: ARINC653 Part 1 I/O API Calls (e.g. Sampling and Queuing Ports); ARINC653 Part 2 I/O API Calls (e.g. File System and Service Access Points); OS I/O API calls (e.g. POS1X Inter-Process Communication); and Other (e.g., Platform specific) API Calls.

Figure 5:
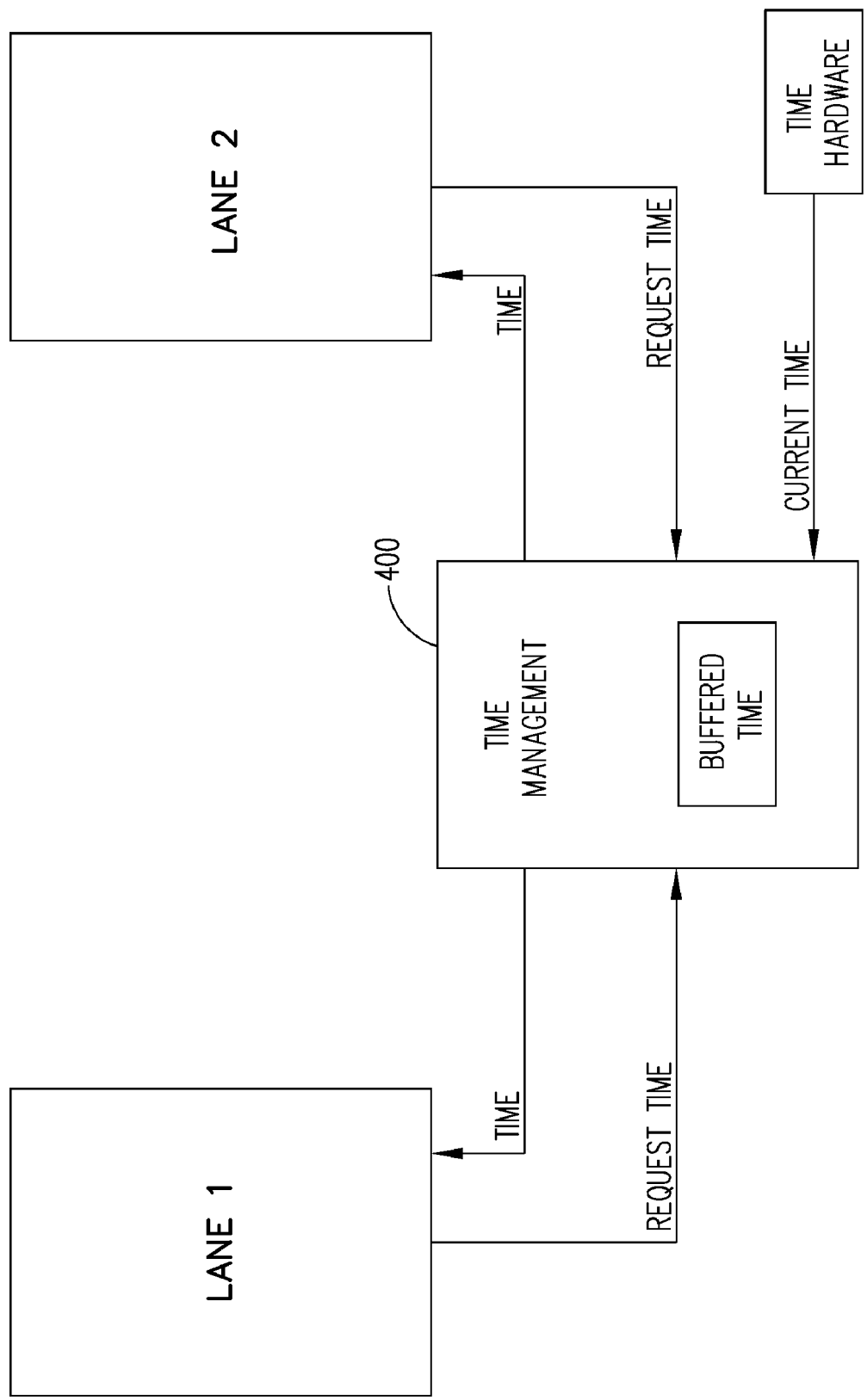
FIG. 5 is a block diagram showing details of the Time Management unit according to the exemplary embodiment.

The TM ensures that all computing lanes receive an equivalent time value for the same request, even if the requests are skewed in time (due to loose synchronization between the computing lanes). In this regard, Time is a special type of input data to the Hosted Application, as its value is produced/controlled by the Module as opposed to being produced by another Hosted Application or an LRU external to the Module. FIG. 5 shows a block diagram of the TM 400 and the signals that it transmits to the lanes and receives from the lanes of a multi-lane Module, according to the first embodiment.

In essence, the TM ensures that every computing lane gets the same exact time that corresponds to the request that was made by the other lane. A 1-deepbuffer (e.g. a buffer that stores only one time entry) holds the value of time that will be delivered to both lanes once they have both issued a request for Time. If a computing lane is "waiting" on the other lane to issue a Time request for a significant period of time (most likely as a result of an error in the other lane), a watchdog timer mechanism (not shown) for that lane is used to detect and respond to this error condition.

The TM according to the first embodiment can be implemented in the Module via hardware/software logic (e.g., in an FPGA on the I/O element in combination with Module software that control access to the FPGA). In order to provide an efficient synchronized time, the TM may be accessible in a 'user' mode (so that a system call is not required).

In one possible implementation of the first embodiment for use on a commercial aircraft, the TM is invoked when the Hosted Application makes the following API calls: Applicable ARINC653 Part 1 and Part 2 API Calls (e.g. Get_Time); Applicable POS1X API Calls (e.g. Timers APIs); and Other (e.g. platform specific) API Calls.

The TM is invoked when the Platform Software has a need for System Time. The TM as shown in FIG. 5 includes a time buffer. The TM receives Requested Time signals from each lane, and outputs Time data to each lane. A Current Time is provided to the TM by way of a Time Hardware unit.

The time buffer may be implemented as an N-deep buffer (e.g., a buffer capable of storing N time values) as opposed to a 1-deep buffer, in an alternative implementation of the first embodiment. This might provide a performance optimization if it is determined that there is a potential for a large amount of skew/drift between the computing lanes and if it is desired to minimize the number of synchronization points (corresponding to points at which one lane must wait on the other lane to catch up).

Figure 6:
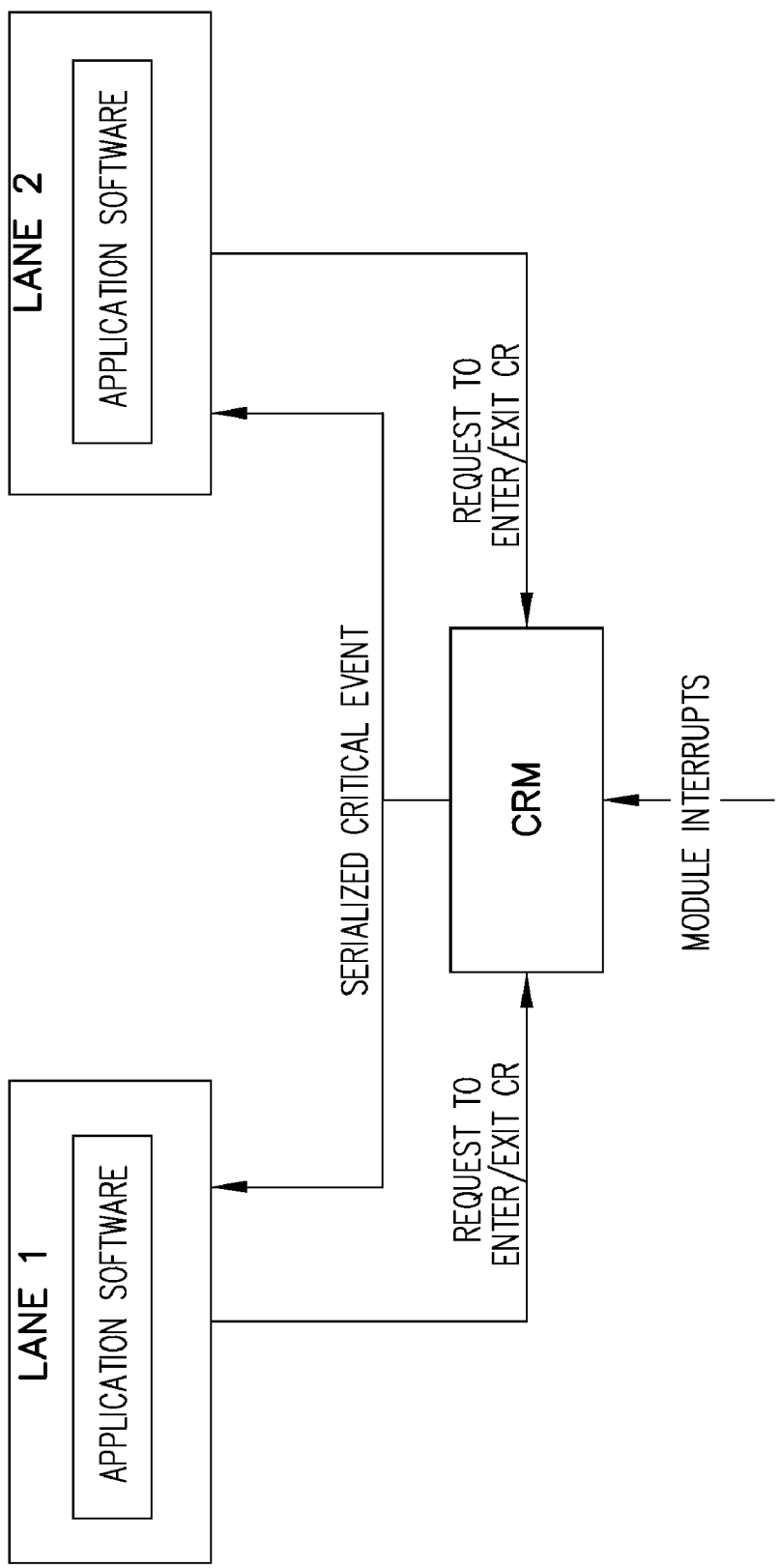
FIG. 6 is a block diagram showing details of the Critical Regions Management unit according to the exemplary embodiment.

FIG. 6 shows a block diagram of the CRM 500 and the signals that it transmits to the lanes and receives from the lanes of a multi-lane Module, according to the first embodiment. The CRM enables critical regions within multiple lanes to be identified and synchronized across computing lanes. These critical regions are essentially regions within the software that cannot be pre-empted by any other threads of execution within the same processing context. Certain epochs generated by the Hosted Application and Module software will interact with the CRM in order to properly synchronize across all computing lanes. CRM ensures that all lanes enter and exit the Module CR state in a synchronized manner.

As can been seen in the block diagram in FIG. 6, the CRM logic requires three sets of input events for a 2 lane module: Lane 1 request to enter or exit a critical region, Lane 2 request to enter or exit a critical region, and Module interrupts. Each lane can generate a request to enter a critical region by the software running on the lane or by the hardware on the lane (e.g. hardware interrupt). Each lane can generate a request to exit a critical region by the software running on the lane or by the hardware on the lane. For a 2 lane Module, CRM has a single output event, the serialized critical event. The serialized critical event includes serialization of timer interrupts and critical region state change events. All computing lanes will perform the same state transitions based on the serialized critical events. For an N-lane processing Module, whereby N is an integer greater than or equal to two, the CRM supports N input requests to enter or exit a critical region, Module Interrupts, and 1 serialized critical event which is output to all N lanes. It will be evident to one skilled in the art, that the CRM could serialize additional critical events based on the implementation of the Module. It will also be evident to one skilled in the art, that the CRM could be extended to support multiple levels of critical regions in order to support such things as multi-level operating systems (e.g. User Mode, Supervisor mode).

The CRM may be implemented as: a combination of hardware logic (e.g., a Field Programmable Gate Array) and/or software logic.

In general, the CRM according to the first embodiment is invoked (via request to Enter/Exit CR and module interrupts) in the following cases: Whenever data is being manipulated that could be an input to a thread of execution that is different than the thread (or process) that is currently running (the CRM ensures atomicity across all computing lanes); Whenever data (including time) is being input or output from the software; Whenever the software attempts to change its thread of execution; When the thread of execution is modifying data that is required to be persistent through a Module restart; Whenever an event occurs that generates a module interrupt.

Figure 7:
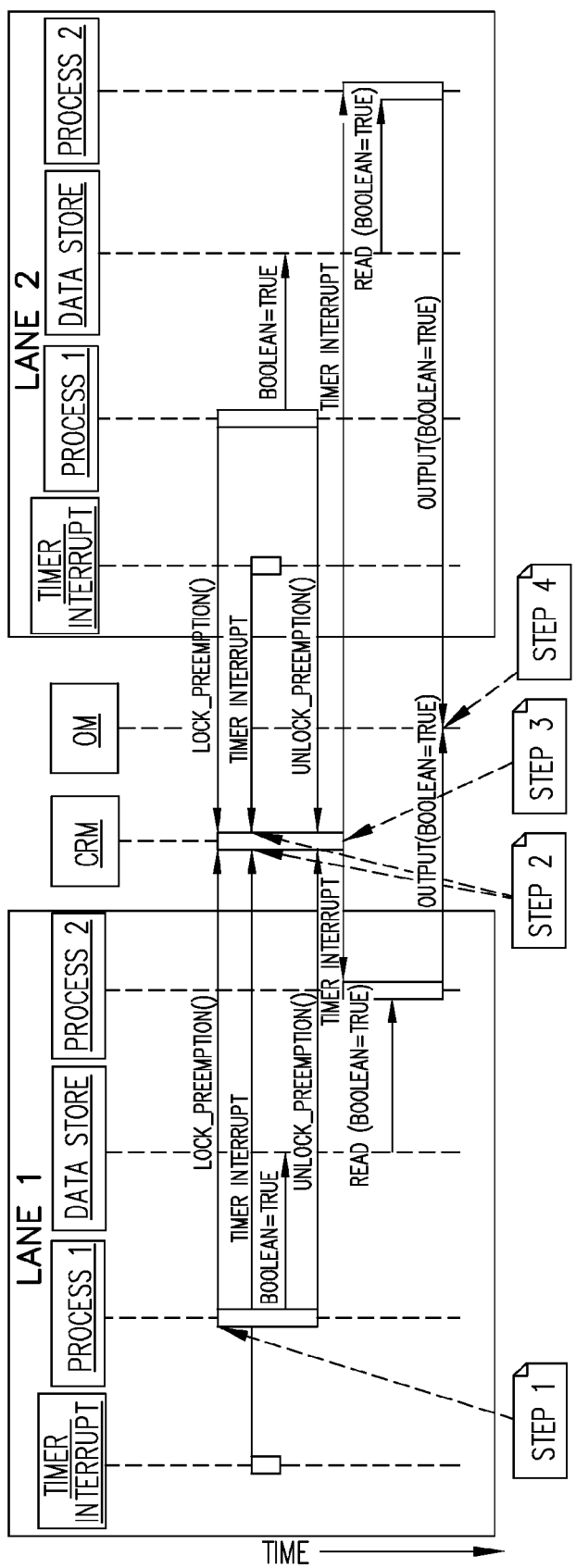
FIG. 7 shows the first scenario (of FIG. 1) for which potential failure conditions are precluded, by utilizing the system and method according to the exemplary embodiment.

FIG. 7 shows an example of how the CRM, in cooperation with the other mechanisms of the I/O processor, will mitigate the scenario shown in FIG. 1.

In the system of FIG. 7, Lanes 1 and 2 are running loosely synchronized including the addition of the OM and CRM units described herein. In this case, loosely synchronized means that Lane 1 could be anywhere from less than one instruction ahead or behind of Lane 2, to any number of instructions ahead or behind of Lane 2. For the example shown in FIG. 7, Lane 1 is "ahead" of Lane 2.

In Step 1, Process 1 in Lane 1 calls the ARINC 653 Lock-Preemption API before setting a global Boolean to True. The call to Lock-Preemption generates a request to enter a Critical Region (CR). However, Lane 1 is not allowed to proceed into the "lock-preemption" state until after Lane 2 also calls the ARINC 653 Lock-Preemption API which generates a request to enter a Critical Region (CR), after which the CRM sends a Serialized Critical Event to both lanes.

In Step 2, when a timer interrupt occurs, (Module Interrupts as shown in FIG. 6), a request to enter a CR is generated. The CRM cannot allow the timer interrupt to cause a context switch in either lane because it cannot generate another Serialized Critical Event until each lane has generated a request to exit a CR.

In Step 3, at some point in time in the future, Lane 1 unlocks preemption and Lane 2 locks and unlocks preemption (which generate requests to exit the CR). At this point in time, both lanes have successfully updated the global data and priority preemption (which starts process 2 in both lanes) can now occur via the CRM delivering the next Serialized Critical Event.

In Step 4, Process 2 in both lanes reads the Boolean and sends an output (True). The data Output Management (OM) unit verifies that both lanes' outputs are equal. As can be seen in FIG. 7, the CRM mitigates the scenario shown in FIG. 1.

Figure 8:
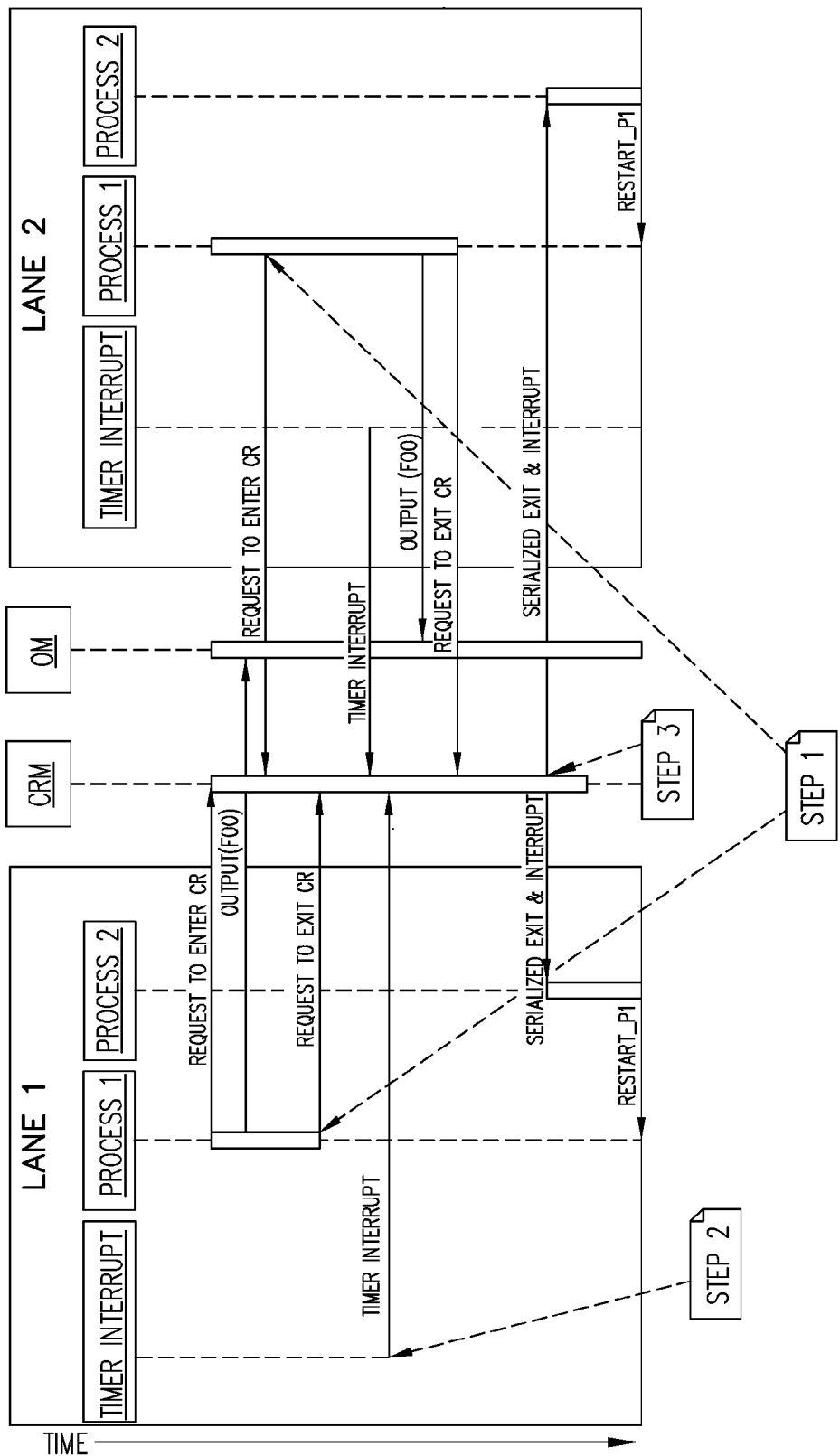
FIG. 8 shows the second scenario (of FIG. 2) for which potential failure conditions are precluded, by utilizing the system and method according to the exemplary embodiment.

FIG. 8 shows an example of how the CRM, in cooperation with OM, will mitigate the scenario shown in FIG. 2.

In the system of FIG. 8, the same software with two processes (Process 1 and Process 2) is running on both Lanes 1 and 2 in a loosely synchronized manner. In this case, loosely synchronized means that Lane 1 could be anywhere from less than one instruction ahead or behind of Lane 2, to any number of instructions ahead or behind of Lane 2. For the example shown in FIG. 8, Lane 1 is "ahead" of Lane 2.

In Step 1, Process 1 in Lane 1 (a low priority background process) sends a request to enter a Critical Region to CRM so that it can begin an output transaction on Port FOO and CRM allow Lane 1 to begin its output transaction. Process 1 in Lane 2 has also sent a request to enter a Critical Region to CRM and has started the output transaction on Port FOO but is "behind" Lane 1. The processing on Lane 1 is at the point that FOO has been output from the Lane, but FOO has not yet been output from Lane 2. Due to the introduction of CRM into the Module, CRM will not allow Lane 1 to exit the Critical Region until Process 1 in Lane 2 has also completed the same output transaction and requested to exit the Critical Region.

In Step 2, a timer interrupt occurs while Lane 1 is waiting to exit the Critical Region and Lane 2 is still in the Critical Region performing its output transaction.

In Step 3, once both lanes have completed their I/O transactions and have sent a request to exit the Critical Region, the serialized interrupt can be delivered and Process 2 in both lanes begins running. After this point, Process 2 can safely restart Process 1 (on both lanes). As can be seen in FIG. 8, the addition of CRM mitigates the failure condition that occurred in the scenario shown in FIG. 2.

The OM validates that the high integrity data flows which are output from the software on all computing lanes. If an error is detected in the output data flows, the OM will prevent the data from being output and will provide an error indication.

It should be noted that there may be a great deal of data that is considered normal-integrity. That is, there may be a great deal of data (and entire Software Applications) that do not require dual-lane I/O elements (and the associated overhead to perform cross-lane compares). The system and method according to the first embodiment enables normal-integrity data to be output from one of the computing lanes (and outputs from the other computing lane are ignored). In one possible implementation of the first embodiment, a configuration parameter designates specific data or an entire Hosted Application as either normal or high integrity.

The method and system according to the first embodiment supports the requirements for high integrity and availability at the source. In addition, because the synchronization points have been abstracted to the state of the software that is running on the platform, the first embodiment may be extended to support dissimilar processors.

The performance of the first embodiment may be limited by the amount of data that can be reasonably synchronized and verified on the I/O plane. If this is an issue, performance can be optimized by utilizing the distinction (in the system) between normal-integrity and high-integrity data and software applications.

The design and implementation of the CRM, TM, IM and OM units do not rely on custom hardware capabilities (custom FPGAs, ASICs,) or attributes of current and/or perhaps obsolete microprocessor capabilities. Thus, modules that are built in accordance with the first embodiment will exhibit the following exemplary beneficial attributes: Ability to utilize state of the art microprocessors containing embedded memory controllers, multiple Phase Lock Loops (PLLs) with different clock recovery circuits, etc. (This will allow the performance of the Module to be readily increased (via microprocessor upgrades) without requiring a significant re-design of the components of the Module that provide CRM, TM, IM and OM.); The frequency of the synchronization epochs (i.e. overhead) should be much less than in the instruction level lockstep architecture. Thus, the synchronization mechanisms should all be directly accessible to the software that needs to access them (no additional system call is required). Therefore, the additional overhead due to synchronization should be on the order of a few instructions at each epoch.

Other benefits of the system and method according to the first embodiment are provided. Performance improvements should scale directly with hardware performance improvements. That is, it does not require special hardware which may put many restrictions on the interface between the processor and the memory sub-systems. Entire Hosted Applications (DO-178B Level B, C, D, E) may be able to be identified as normal-integrity. When this is done, the IM, TM, CRM and OM elements will be disabled for all data and control associated with this Hosted Application, all transactions will only occur on one computing lane and the other computing lane can be in the idle state during this time. Not only will this benefit performance, but it may also result in a reduction in power consumption (heat generation) if the processor in the inactive computing lane can be put into a "sleep" mode during normal-integrity time windows.

This first embodiment enables the System Integrator to take advantage of the notion of normal-integrity Hosted Applications by utilizing the spare time in the inactive computing lane to run a different Hosted Application. This may result in performance improvements for systems with a large amount of normal-integrity Hosted Applications.

The system and method according to the first embodiment lends itself to being able to run dual-independent computing lanes, thus effectively doubling the performance of the Module in normal-integrity mode.

The system and method according to the first embodiment supports dissimilar processors on different computing lanes on the Module. In this case, it may be possible (for example) that the floating point unit of the dissimilar processors might provide different rounding/truncate behavior, which may result in slightly different data being out from the dissimilar computing lanes. Accordingly, an approximate data compare (as opposed to an exact data compare may be utilized for certain classes of output data flows in order to support dissimilar processors.

The software application interactions with the mechanisms that employ IM, TM, CRM and OM may be built into any operating system APIs (i.e., no "special" APIs will be required). Therefore, the system and method according to the first embodiment is believed to place only minimal constraints on the software application developers.

It is expected that the only impact on the System Integrator (and or tools) will be that the I/O configuration data will have (optional) attributes to identify data flows and Hosted Applications as High-Integrity or Normal Integrity.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of providing high integrity checking for an N-lane computer processing module (Module), N being an integer greater than equal to two, the method comprising the steps of:
    detecting, by a data Output Management unit (OM), when any of the N processing lanes sends different output data; and
    configuring each Hosted Application as either normal or high integrity; and
    determining whether the respective processing lane receives exactly the same set of high-integrity data as all other of the N processing lanes, and outputting an error condition otherwise; and
    determining, whether the respective processing lane output exactly the same set of high-integrity data as all other of the N processing lanes, and outputting an error condition otherwise; and
    for the Hosted Applications configured as high integrity, running an identical version of the software source code targeted for similar or dissimilar microprocessors on all N processing lanes, and activating a Time Management Unit, Critical Regions Management Unit, data input Management Unit and data Output Management Unit for each of the N processing lanes; and
    for the Hosted Applications configured as normal integrity, running a copy of the software on one of the N processing lanes, and not activating the Time Management Unit, Critical Regions Management Unit, input Management Unit and Output Management Unit for the one activated processing lane while that Hosted Application is running.

2. The method according to claim 1, further comprising:
    identifying critical regions within software that cannot be preempted by any other threads of execution separate from a thread of execution currently running the respective regions within software.

3. The method according to claim 1, wherein both high-integrity data and normal-integrity data flows over the N processing lanes, and wherein only the high-integrity data is operated on by the high-integrity Module.

4. The method according to claim 1, wherein the detecting step is implemented as a finite-state machine.

5. A method of providing high integrity checking for an N-lane computer processing module (Module), N being an integer greater than equal to two, the method comprising the steps of:

detecting, by a data Output Management unit (OM), when any of the N processing lanes sends different output data, said detecting step being implemented as a finite-state machine; and configuring each Hosted Application as either normal or high integrity; and determining whether the respective processing lane receives exactly the same set of high-integrity data as all other of the N processing lanes, and outputting an error condition otherwise; and determining, whether the respective processing lane output exactly the same set of high-integrity data as all other of the N processing lanes, and outputting an error condition otherwise; and for the Hosted Applications configured as high integrity, running an identical version of the software source code targeted for similar or dissimilar microprocessors on all N processing lanes, and activating a Time Management Unit, Critical Regions Management Unit, data input Management Unit and data Output Management Unit for each of the N processing lanes; and for the Hosted Applications configured as normal integrity, running a copy of the software on one of the N processing lanes, and not activating the Time Management Unit, Critical Regions Management Unit, input Management Unit and Output Management Unit for the one activated processing lane; and identifying critical regions within software that cannot be preempted by any other threads of execution separate from a thread of execution currently running the respective regions within software.

6. A high-integrity, N-lane computer processing module (Module) system, N being an integer greater than or equal to two, the Module comprising:
one Hosted Application Element and I/O Element per processing lane; and
a Time Management unit (TM) configured to determine an equivalent time value for a request made by software running on each of the N processing lanes, irrespective as to when the request is actually received and acted on by each of the N processing lanes; and
a Critical Regions Management unit (CRM) configured to enable critical regions within the respective lane to be identified and synchronized across all of the N processing lanes;
a data Input Management (IM) unit configured to ensure that each respective lane receives exactly the same set of high-integrity data as all other of the N processing lanes, and to output an error condition otherwise; and
a data Output Management (OM) unit configured to determine whether the respective lane output exactly the same set of high-integrity data as all other of the N processing lanes, and to output an error condition otherwise.

7. The Module according to claim 6, wherein the critical regions identified by the CRM correspond to regions within software that cannot be preempted by any other threads of execution separate from a thread of execution currently running.

8. The Module according to claim 6, wherein the TM comprises a 1-deep buffer.

9. The Module according to claim 6, wherein the TM comprises an M-deep buffer, M being an integer greater than or equal to two.

10. The Module according to claim 6, wherein both high-integrity data and normal-integrity data flows over the N processing lanes, and wherein only the high-integrity data is operated on by the high-integrity Module.

11. The Module according to claim 6, wherein the TM is implemented as a finite-state machine.

12. The Module according to claim 6, wherein the CRM is implemented as a finite-state machine.

13. A high-integrity, N-lane computer processing module (Module) system, N being an integer greater than or equal to two, the Module comprising:
one Hosted Application Element and I/O Element per processing lane; and
a Time Management unit (TM) implemented as a finite-state machine and configured to determine an equivalent time value for a request made by software running on each of the N processing lanes, irrespective as to when the request is actually received and acted on by each of the N processing lanes;
a Critical Regions Management unit (CRM) implemented as a finite-state machine and configured to enable critical regions within the respective lane to be identified and synchronized across all of the N processing lanes;
a data Input Management (IM) unit configured to ensure that each respective lane receives exactly the same set of high-integrity data as all other of the N processing lanes, and to output an error condition otherwise; and
a data Output Management (OM) unit configured to determine whether the respective lane output exactly the same set of high-integrity data as all other of the N processing lanes, and to output an error condition otherwise;
wherein both high-integrity data and normal-integrity data flows over the N processing lanes, and wherein only the high-integrity data is operated on by the high-integrity Module.

14. A computer program product embodied in computer readable medium selected from the group consisting of RAM, ROM, EPROM, EEPROM, CD-ROM or other optical disk storage, magnetic disk storage or other magnetic storage devices_and providing high integrity checking for an N-lane computer processing module (Module), N being an integer greater than or equal to two, the computer program product, when executed by a computer, causing the computer to perform the following steps:
detecting, by a data Output Management unit, when any of the N processing lanes sends different output data; and
configuring each Hosted Application as either normal or high integrity; and
determining whether the respective processing lane receives exactly the same set of high-integrity data as all other of the N processing lanes, and outputting an error condition otherwise; and
determining, whether the respective processing lane output exactly the same set of high-integrity data as all other of the N processing lanes, and outputting an error condition otherwise; and
for the Hosted Applications configured as high integrity, running an identical version of the software source code targeted for similar or dissimilar microprocessors on all N processing lanes, and activating a Time Management Unit, Critical Regions Management Unit, data Input Management Unit and data Output Management Unit for each of the N processing lanes; and
for the Hosted Applications configured as normal integrity, running a copy of the software on one of the N processing lanes, and not activating the Time Management Unit, Critical Regions Management Unit, data Input Management Unit and data Output Management Unit for the one activated processing lane while that Hosted Application is running.

15. The computer program product according to claim 14, further comprising:
identifying critical regions within software that cannot be preempted by any other threads of execution separate from a thread of execution currently running the respective regions within software.

16. The computer program product according to claim 14, wherein both high-integrity data and normal-integrity data flows over the N processing lanes, and wherein only the high-integrity data is operated on by the high integrity Module.

17. The computer program product according to claim 14, wherein the detecting step is implemented as a finite-state machine.

18. A computer program product embodied in computer readable medium selected from the group consisting of RAM, ROM, EPROM, EEPROM, CD-ROM or other optical disk storage, magnetic disk storage or other magnetic storage devices and providing high integrity checking for an N-lane computer processing module (Module), N being an integer greater than or equal to two, the computer program product, when executed by a computer, causing the computer to perform the following steps:
detecting, by a data Output Management unit, when any of the N processing lanes sends different output data, said detecting step being implemented as a finite-state machine; and
configuring each Hosted Application as either normal or high integrity; and
determining whether the respective processing lane receives exactly the same set of high-integrity data as all other of the N processing lanes, and outputting an error condition otherwise; and
determining, whether the respective processing lane output exactly the same set of high-integrity data as all other of the N processing lanes, and outputting an error condition otherwise; and
for the Hosted Applications configured as high integrity, running an identical version of the software source code targeted for similar or dissimilar microprocessors on all N processing lanes, and activating a Time Management Unit, Critical Regions Management Unit, data Input Management Unit and data Output Management Unit for each of the N processing lanes; and
for the Hosted Applications configured as normal integrity, running a copy of the software on one of the N processing lanes, and not activating the Time Management Unit, Critical Regions Management Unit, data Input Management Unit and data Output Management Unit for the one activated processing lane while that Hosted Application is running; and
identifying critical regions within software that cannot be preempted by any other threads of execution separate from a thread of execution currently running the respective regions within software;
wherein both high-integrity data and normal-integrity data flows over the N processing lanes, and wherein only the high-integrity data is operated on by the high integrity Module.

* * * * *